April 7, 1970 M. R. NETTLETON 3,505,484

CALL HOLDING DEVICE FOR TELEPHONE OPERATOR'S SWITCHBOARD

Filed Sept. 21, 1967

INVENTOR.
MALVERN R. NETTLETON
BY
Mc Cormick, Paulding & Huber
ATTORNEYS

United States Patent Office 3,505,484

Patented Apr. 7, 1970

3,505,484

CALL HOLDING DEVICE FOR TELEPHONE OPERATOR'S SWITCHBOARD

Malvern R. Nettleton, 184 Stillwold Drive, Wethersfield, Conn. 06109

Filed Sept. 21, 1967, Ser. No. 669,571
Int. Cl. H04m 5/04
U.S. Cl. 179—91 2 Claims

ABSTRACT OF THE DISCLOSURE

A rectangular enclosure is adapted for attachment to a conventional telephone operator's switchboard adjacent the upper edge of the vertical panel thereof. The enclosure has a plurality of indexed dummy extension sockets, in the example shown two such sockets are provided per extension number, to permit the operator to continuously identify an incoming call by inserting the appropriate extension plug in one of the dummy sockets until the extension line desired by the caller is no longer busy.

BACKGROUND OF INVENTION

Every telephone switchboard operator, has recurrently, been confronted with the dilemma of having to remember a particular extension number to which an incoming call should be connected some time after the person making the call has given the operator this information. Even the most experienced operators will admit to the difficulty of trying to remember which extension number a held call should be connected to at the termination of a prior call. The problem is most pronounced when the intervening time has been occupied by the operator in a rapid connecting and disconnecting of trunk and extension lines during a particularly busy period. Furthermore, if more than one call is being held it is usually difficult to remember even in less hectic circumstances, which held call has requested which extension number. Usually, the situation can only be resolved by the operator's verbal inquiry as to the desired extension. Thus, the operator is forced to confess that his ability has not been adequate for the particular situation. The caller on the other hand is usually irritated at the long delay, and pictures the operator as having been off wool-gathering instead of tending to his work. The resulting verbal exchange can be damaging to the operator's employer, and, of course, to the operator himself.

Present day telephone operator switchboards do provide for holding an incoming call in limbo by electrically shunting the call to a holding circuit. However, the operator has no way of later identifying that particular trunk line except by resorting to his own memory in the matter.

The plight of the person making the incoming call which must be held in the manner suggested above has been recognized, and Patent No. 3,246,082 issued to Levy Apr. 12, 1966 discloses a system for connecting the held call to a source of program material, such as music or the like, to pacify the caller who must hold for an extended period of time to await connection to a certain extension line.

The prior art does not shown, however, any recognition of the dilemma presented to the telephone operator who must hold several such incoming calls, with each of the held calls having different desired extensions all of which must be remembered by the operator.

SUMMARY OF INVENTION

This invention relates to telephone switchboards and deals more particularly with a device adapted for attachment thereto for the identification of incoming phone calls which must be "held" by the operator for later connection with a particular extension line.

The general object of the present invention is to provide for use by the telephone operator in order to enable incoming phone calls to held for extended periods of time, and nevertheless to be readily identified for later connection with a particular extension.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

DETAILED DESCRIPTION OF THE DRAWING

Figure 1:
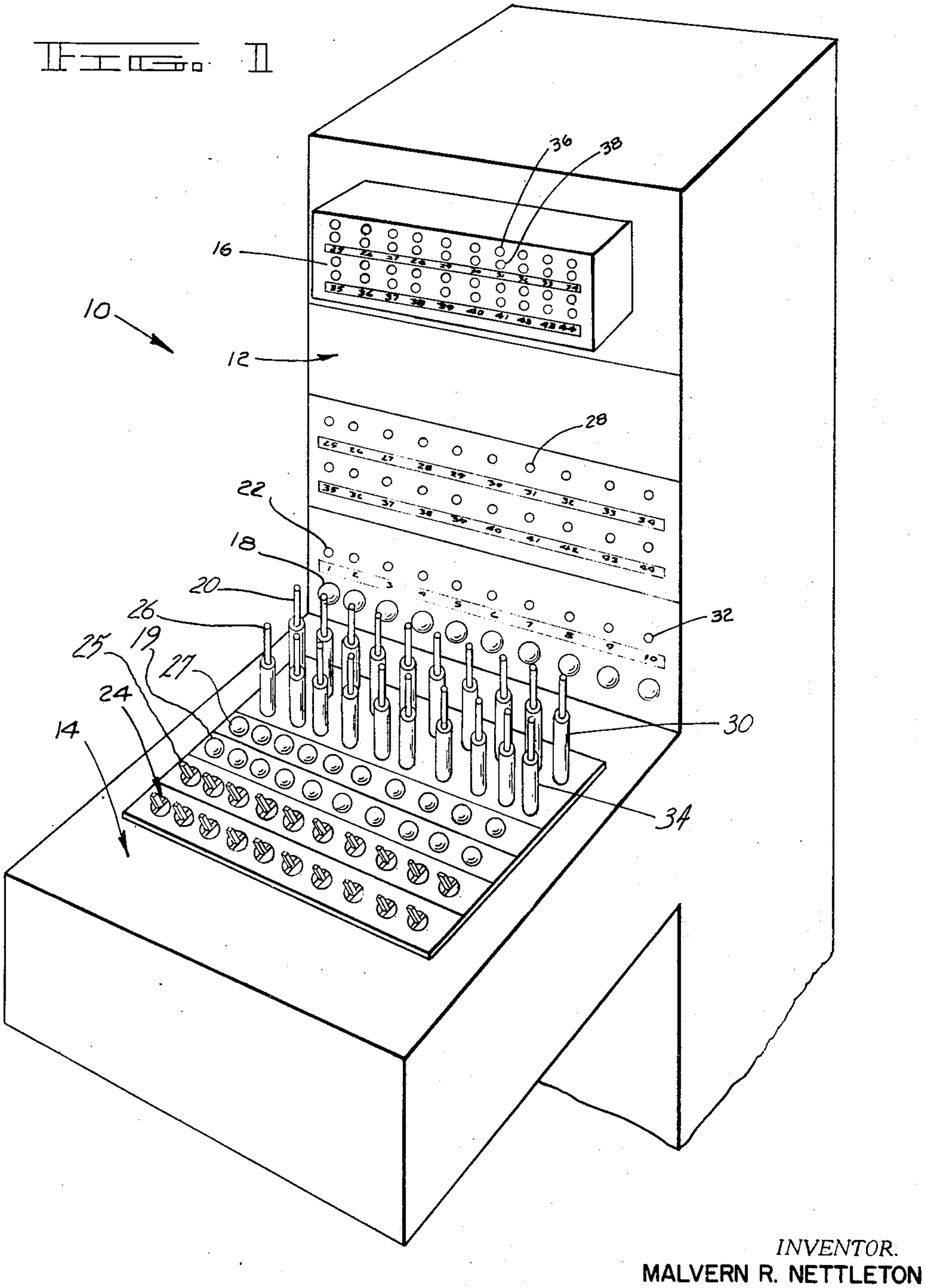
FIG. 1 is a perspective view of a telephone operator's switchboard to which a device of the present invention has been mounted.

Turning now to the drawing in greater detail, FIG. 1 shows a conventional telephone operator's switchboard or console 10 having a generally vertically disposed panel, or face 12, and a horizontally disposed paned 14 in front of both of which panels the telephone operator is generally seated. A device of the present invention is indicated generally at 16, being mounted at the top of the vertical face, or panel 12, for a purpose to be discussed in greater detail hereinbelow.

The use of the conventional switchboard, although well known, will be summarized briefly herein for purposes of emphasizing the usefulness of the device 16. When an incoming call is received at the switchboard, a light associated with a particular trunk line or plug numbered 1 through 10, will illuminate, as for example the light 18 associated with trunk line 1. The operator then pulls out the trunk plug 26 associated with trunk line number 1 and inserts the same into the socket provided for this purpose, indicated generally at 22. The associated trunk key 24 can then be moved to a position for achieving verbal contact with the incoming caller. The operator at this point learns which extension line the incoming caller desires, whereupon he places the extension plug 20 associated with the plug 26 of the trunk line number 1 into the appropriate socket as, for example, extension line 31 indicated generally at 28. The next step taken by the operator is to depress the extension key 25 in order to ring up the desired extension line in this case the line associated with the socket 28. A light 27 associated with this particular extension line illuminates when extension plug 20 is inserted in socket 28 and remains lit until the receiver in extension line 31 is lifted. The light 27 then goes out until one or the other of the two parties hangs up. When one or the other of the two parties hangs up, the light 27 comes on once again to signal the operator to disconnect both the extension plug 20 and the trunk plug 26. The light 19 serves a similar function for the trunk line itself, in that it will illuminate if the trunk plug is disconnected, either deliberately, as by disconnection, or accidentally.

The foregoing procedure can be continued until all of the trunk lines 1 through 10 have been utilized, or until more than one incoming caller desires a particular extension line. It is in the latter case that the problem referred to hereinabove arises, and therefore the description to follow presupposes that extension line 31 is to be sequentially connected to a plurality of incoming calls.

If it be assumed that extension line 31 is busy, as for example if the extension plug 20 is connected therewith, the next incoming caller desiring this extension will have to be held in a shunting, or holding circuit of well known type until his particular extension plug can be connected with the desired extension socket 28. For example, if trunk plug 34 associated with trunk line 10 is connected in its associated socket indicated at 32, and if the incoming caller desires to be connected with extension line 31, the associated extension plug 30 will have to be mentally associated with extension line 31 by the operator until the necessary connection can be completed by the operator. This is the dilemma referred to hereinabove. The same situation can of course occur if someone is making an outgoing call on the particular extension line desired by an incoming caller. This situation would normally become apparent to the operator when he attempted to plug into the desired extension socket. A buzz would indicate this condition, and the aforementioned dilemma would be presented.

In accordance with the present invention, and given the situation set forth in the preceding paragraph extension plug 30 associated with trunk line 10 need only be plugged into a dummy socket 36 provided for this purpose in the device 16. A second dummy socket 38 is also associated with extension line 31 and can be utilized in the event that more than one additional incoming caller is waiting to be connected with socket 28 associated with extension 31. Thus, the device 16 comprises simply a rectangular enclosure adapted for attachment to the conventional telephone operator's switchboard, and having a plurality of dummy sockets associated with each of the extension lines, or sockets, normally provided on the vertical face of the telephone operator's console. Each set of dummy sockets is clearly labeled as to the appropriate extension line with the same indicia normally provided for the live extension sockets, indicated generally at 28. Thus, up to two incoming calls can be held simultaneously without creating the telephone operator confusion discussed hereinabove with respect to a conventional telephone operator's switchboard. While more than two such dummy sockets can be provided in association with each of the extension lines, it has been found that when two such calls are being held, if the incoming caller is made aware of this fact, he will invariably elect to call back later rather than wait. In any event, should a particular extension line be so sought after by in incoming caller, the situation would be so exceptional that the operator would have no difficulty in remembering it.

I claim:

1. In combination with a telephone operator's switchboard having a plurality of trunk and extension plugs and having live sockets for said trunk and extension plugs respectively, whereby an incoming call can be readily connected to a particular extension line, means defining at least one dummy extension socket corresponding to each of said live extension sockets to permit the operator to hold an incoming call in an easily identifiable condition until the desired extension line is opened.

2. The combination as set forth in claim 1 wherein two such dummy extension sockets are provided for each live extension socket.

References Cited

UNITED STATES PATENTS 668,044 2/1901 Gilman et al. -------- 179—91

WILLIAM C. COOPER, Primary Examiner

J. S. BLACK, Assistant Examiner

U.S. Cl. X.R.

179—42